(12) United States Patent
Ito et al.

(10) Patent No.: US 11,306,778 B2
(45) Date of Patent: Apr. 19, 2022

(54) SINTERED BEARING FOR AN EGR VALVE AND MANUFACTURING METHOD THEREOF

(71) Applicant: NTN CORPORATION, Osaka (JP)

(72) Inventors: Yoshinori Ito, Aichi (JP); Hiroharu Nagata, Aichi (JP); Tomoyuki Seto, Mie (JP); Takahiro Gotou, Aichi (JP)

(73) Assignee: NTN CORPORATION, Osaka (JP)

( * ) Notice: Subject to any disclaimer, the term of this patent is extended or adjusted under 35 U.S.C. 154(b) by 187 days.

(21) Appl. No.: 15/021,283

(22) PCT Filed: Sep. 11, 2014

(86) PCT No.: PCT/JP2014/074090
§ 371 (c)(1),
(2) Date: Mar. 11, 2016

(87) PCT Pub. No.: WO2015/037668
PCT Pub. Date: Mar. 19, 2015

(65) Prior Publication Data
US 2016/0223017 A1    Aug. 4, 2016

(30) Foreign Application Priority Data

Sep. 13, 2013  (JP) .............................. JP2013-190880
Sep. 4, 2014   (JP) .............................. JP2014-180529

(51) Int. Cl.
*F16C 33/12* (2006.01)
*C22C 9/01* (2006.01)
(Continued)

(52) U.S. Cl.
CPC .......... *F16C 33/128* (2013.01); *B22F 1/0003* (2013.01); *B22F 3/1003* (2013.01);
(Continued)

(58) Field of Classification Search
CPC .... F16C 33/128; F16C 33/121; F16C 33/145; F16C 2204/10; F16C 2220/20;
(Continued)

(56) References Cited

U.S. PATENT DOCUMENTS

2003/0049148 A1\* 3/2003 Takayama ............... F16C 33/14
419/8
2003/0185694 A1\* 10/2003 Oi .......................... F16C 33/121
417/423.12
(Continued)

FOREIGN PATENT DOCUMENTS

CN   101107376        1/2008
CN   102886521 A  \*  1/2013
(Continued)

OTHER PUBLICATIONS

Machine Translation of Masuoka (CN-102886521) (Jan. 2013) (Year: 2013).\*

(Continued)

*Primary Examiner* — Paul A Wartalowicz
*Assistant Examiner* — Ryan L Heckman
(74) *Attorney, Agent, or Firm* — Wenderoth, Lind & Ponack, L.L.P.

(57) ABSTRACT

Provided is a sintered bearing for an EGR valve, including raw material powder including 9% by weight to 12% by weight of aluminum, 0.1% by weight to 0.6% by weight of phosphorus, 3% by weight to 10% by weight of graphite, and the balance including copper as a main component, and inevitable impurities. The sintered bearing has a structure of a sintered aluminum-copper alloy. The sintered bearing further includes free graphite distributed in pores formed so as to be dispersed.

4 Claims, 8 Drawing Sheets

(51) Int. Cl.
*B22F 3/10* (2006.01)
*F16C 33/14* (2006.01)
*C22C 1/04* (2006.01)
*C22C 32/00* (2006.01)
*B22F 5/10* (2006.01)
*B22F 5/00* (2006.01)
*B22F 1/00* (2022.01)
*B22F 3/16* (2006.01)
*B22F 3/24* (2006.01)

(52) U.S. Cl.
CPC ............... *B22F 3/16* (2013.01); *B22F 3/24* (2013.01); *B22F 5/00* (2013.01); *B22F 5/106* (2013.01); *C22C 1/0425* (2013.01); *C22C 9/01* (2013.01); *C22C 32/0084* (2013.01); *F16C 33/121* (2013.01); *F16C 33/145* (2013.01); *B22F 2998/10* (2013.01); *F16C 2204/10* (2013.01); *F16C 2220/20* (2013.01); *F16C 2361/91* (2013.01)

(58) Field of Classification Search
CPC .. F16C 2361/91; B22F 1/0003; B22F 3/1003; B22F 3/16; B22F 3/24; B22F 5/00; B22F 5/106; B22F 2998/10; C22C 1/0425; C22C 9/01; C22C 32/0084
See application file for complete search history.

(56) References Cited

U.S. PATENT DOCUMENTS

| | | |
|---|---|---|
| 2007/0258668 A1 | 11/2007 | Shimizu et al. |
| 2012/0177528 A1 | 7/2012 | Takayama |
| 2016/0223018 A1 | 8/2016 | Ito et al. |

FOREIGN PATENT DOCUMENTS

| | | |
|---|---|---|
| CN | 105473258 | 4/2016 |
| EP | 3 040 141 | 7/2016 |
| JP | 56-152902 | 11/1981 |
| JP | 2003-138328 | 5/2003 |
| JP | 2003-342700 | 12/2003 |
| JP | 2006-63398 | 3/2006 |
| JP | 2009-7650 | 1/2009 |
| JP | 2009-114486 | 5/2009 |
| JP | 2009114486 A * | 5/2009 |
| JP | 2013-23732 | 2/2013 |
| WO | 2013/137347 | 9/2013 |

OTHER PUBLICATIONS

I.J. Polmear: 6th Int. Conf. on Aluminum Alloys, T. Sato, S. Kumai, T. Kobayashi, and Y. Murakami, eds., JILM, Japan, 1998, pp. 75-86 (Year: 1998).*

Machine translation of JP-2009114486-A (Year: 2009).*

Office Action dated Sep. 14, 2017 in Chinese Application No. 201480049189.1, with English Translation of Search Report.

International Preliminary Report on Patentability dated Mar. 15, 2016 in International Application No. PCT/JP2014/074090.

European Search Report dated May 22, 2017 in counterpart European Patent Application 14844205.6.

Office Action dated Jan. 5, 2017 in corresponding Chinese patent application No. 201480049189.1, with English translation.

International Search Report and Written Opinion dated Nov. 11, 2014 in corresponding International Application No. PCT/JP/2014/074090 (with English translation).

* cited by examiner

SINTERED BEARING FOR AN EGR VALVE AND MANUFACTURING METHOD THEREOF

TECHNICAL FIELD

The present invention relates to a sintered bearing for an EGR valve excellent in abrasion resistance, corrosion resistance, and sliding characteristics in a high-temperature dry environment, and to a method of manufacturing the sintered bearing for an EGR valve.

BACKGROUND ART

In general, as a part of exhaust emission controls of internal-combustion engines such as an automobile engine, in those internal-combustion engines, there has been widely adopted an exhaust gas recirculation apparatus (hereinafter sometimes referred to as "EGR apparatus") configured to reduce a nitrogen oxide (NOx) by mixing once-discharged gas with intake air again to decrease the oxygen concentration of air in a combustion chamber, to thereby decrease a combustion temperature. The EGR is an abbreviation of "Exhaust Gas Recirculation". In the EGR apparatus, a part of exhaust gas to be discharged is recirculated to an intake side as recirculation exhaust gas (hereinafter sometimes referred to as "EGR gas"), and in order to regulate the flow rate of the EGR gas, a recirculation exhaust gas flow rate control valve (hereinafter sometimes referred to as "EGR valve") is used.

In recent years, increase in output power and reduction in fuel consumption of internal-combustion engines have been remarkable, and there has been a strong demand for reduction in weight and compactness. Therefore, the EGR valve needs to satisfy those demands. Further, the EGR valve has come to be arranged in the vicinity of the combustion chamber of the engine, and as a result, there may be a case in which the EGR valve is exposed to a high-temperature environment reaching a temperature as high as 300° C. or more along with increase in engine heat generation amount involved in increase in output power. Due to such use conditions and environment, a bearing configured to slidably support a reciprocating shaft configured to operate a valve element of the EGR valve is required to have abrasion resistance, corrosion resistance, and sliding characteristics in a high-temperature dry (non-oil impregnation) environment.

As a sintered bearing to be used for such a purpose, for example, Patent Document 1 discloses a Cu—Ni—Sn—C—P-based sintered bearing.

On the other hand, as a sintered bearing excellent in mechanical characteristics and corrosion resistance, an aluminum bronze-based sintered bearing is known. This sintered bearing has a problem in that an aluminum oxide film generated on the surface during increase in temperature of sintering inhibits diffusion of aluminum, and hence a sintered compact having sufficient corrosion resistance and strength cannot be obtained easily. Patent Document 2 discloses a technology regarding mixed powder for sintered aluminum-containing copper alloy and a method of producing the mixed powder in order to solve the above-mentioned problem.

PRIOR ART DOCUMENTS

Patent Documents

Patent Document 1: JP 2006-63398 A
Patent Document 2: JP 2009-7650 A

SUMMERY OF THE INVENTION

Problems to Be Solved By the Invention

In the Cu—Ni—Sn—C—P-based sintered bearing disclosed in Patent Document 1, although strength and abrasion resistance are enhanced, corrosion resistance cannot be considered to be sufficient. Further, the sintered bearing contains Ni, which is a rare metal, and hence involves a problem in terms of cost as well.

The aluminum-containing copper alloy powder disclosed in Patent Document 2 is excellent in moldability and sintering property. However, further investigation is necessary in order to obtain a product suitable for mass production satisfying stable corrosion resistance, stable mechanical characteristics, compactness, and reduction in cost as an aluminum bronze-based sintered bearing using the aluminum-containing copper alloy powder.

In view of the problems of the related art, it is an object of the present invention to provide an aluminum bronze-based sintered bearing for an EGR valve, in which abrasion resistance, corrosion resistance, and sliding characteristics in a high-temperature dry environment are enhanced, and compactness and reduction in cost are realized, and to provide a method of manufacturing the aluminum bronze-based sintered bearing for an EGR valve, which has good productivity and low cost, and is thus suitable for mass production.

Solutions to the Problems

In order to improve the bearing function and achieve compactness, reduction in cost, and enhanced productivity in the aluminum bronze-based sintered bearing and the method of manufacturing the aluminum bronze-based sintered bearing, on the premise of a novel idea of effective use of expansion caused by sintering, the inventors of the present invention have made various investigations and test evaluations so as to ensure performance, such as abrasion resistance, corrosion resistance, and sliding characteristics in a high-temperature dry environment, in the sintered bearing for an EGR valve in a high-temperature dry environment as described above. With this, the inventors of the present invention have obtained the following findings, to thereby achieve the present invention.

(1) Regarding the sliding characteristics in a high-temperature dry environment of the sintered bearing for an EGR valve, there is no problem of initial conformability. Therefore, the inventors of the present invention have focused on the fact that a general aluminum blending amount in an aluminum bronze sintered bearing can be employed.

(2) It has been found that, in a dry environment, as the addition amount of graphite is increased, a friction coefficient is decreased, and sliding characteristics become excellent. Meanwhile, when the addition amount of graphite is increased, the diffusion of aluminum into copper is inhibited, and hence care needs to be taken.

(3) Regarding abrasion resistance, when the addition amount of graphite is increased, abrasion resistance is enhanced. However, when the addition amount of graphite reaches 10% by weight, the abrasion amount is slightly increased, which is considered to be caused by decrease in material strength.

(4) When the addition amount of graphite is increased, the weight change rate due to organic acid corrosion is small, and the weight change rate hardly changes even after standing for a long period of time.

(5) In a relationship between the blending amount of aluminum and the aluminum bronze structure, as the blending amount of aluminum is increased, the ratio of a β-phase is increased. The β-phase is subjected to eutectoid transformation at 565° C. to form an α-phase and a γ-phase, and as the blending amount of aluminum is increased, the ratio of the γ-phase is increased. The γ-phase degrades organic acid corrosion resistance in the sintered bearing for an EGR valve. Therefore, in the case where aluminum-copper alloy powder is used as a copper source and powder of a copper simple substance is not added, the ratio of the γ-phase and the α-phase is set to 0≤γ-phase/α-phase≤0.10.

(6) In a relationship between the sintering temperature and the corrosion resistance, when the sintering temperature is increased, the diffusion of aluminum is increased to enhance corrosion resistance.

(7) It is considered that phosphorus serving as an additive can reduce the amount of aluminum through increase in diffusion of aluminum during a sintering step and reduce the precipitation of the γ-phase of an aluminum structure that degrades corrosion resistance.

As a technical solution for achieving the above-mentioned object, according to one embodiment of the present invention, there is provided a sintered bearing for an EGR valve, comprising raw material powder comprising 9% by weight to 12% by weight of aluminum, 0.1% by weight to 0.6% by weight of phosphorus, 3% by weight to 10% by weight of graphite, and the balance comprising copper as a main component, and inevitable impurities, the sintered bearing having a structure of a sintered aluminum-copper alloy, the sintered bearing further comprising free graphite distributed in pores formed so as to be dispersed. With this, an aluminum bronze-based sintered bearing for an EGR valve, which is excellent in abrasion resistance, corrosion resistance, and sliding characteristics in a high-temperature dry environment and which achieves compactness and reduction in cost, can be realized.

Further, as a method of manufacturing a sintered bearing for an EGR valve according to one embodiment of the present invention, there is provided a method of manufacturing a sintered bearing for an EGR valve, the sintered bearing comprising raw material powder comprising 9% by weight to 12% by weight of aluminum, 0.1% by weight to 0.6% by weight of phosphorus, 3% by weight to 10% by weight of graphite, and the balance comprising copper as a main component, and inevitable impurities, the method using aluminum-copper alloy powder, electrolytic copper powder, phosphorus-copper alloy powder, and graphite powder as the raw material powder, the method comprising at least: a molding step of molding a green compact having a sintering aid added to the raw material powder; a sintering step of obtaining, from the green compact, a sintered compact having a structure of an aluminum-copper alloy; and a sizing step of subjecting the sintered compact to dimension shaping. With this, a method of manufacturing an aluminum bronze-based sintered bearing for an EGR value, which has good productivity and low cost, and is thus suitable for mass production, can be realized. The sintered bearing for an EGR valve manufactured based on this method is excellent in abrasion resistance, corrosion resistance, and sliding characteristics in a high-temperature dry environment and can achieve compactness and reduction in cost.

It is preferred that the structure of the aluminum-copper alloy comprise an α-phase. The α-phase is effective for organic acid corrosion resistance.

In the case where the structure of the aluminum-copper alloy (hereinafter sometimes referred to as "aluminum bronze structure") uses aluminum-copper alloy powder as a copper source and powder of a copper simple substance is not added, it is preferred that a ratio γ-phase/α-phase of the γ-phase and the α-phase be set to 0≤γ-phase/α-phase≤0.10. When the ratio γ-phase/α-phase falls within the range of 0≤γ-phase/α-phase≤0.10, organic acid corrosion resistance becomes excellent.

In the above-mentioned sintered bearing for an EGR valve, it is preferred that the sintered bearing for an EGR valve be free of tin to be added as the sintering aid. Tin is not preferred because tin inhibits the diffusion of aluminum.

In the method of manufacturing a sintered bearing for an EGR valve, it is preferred that a total of 0.05% by weight to 0.2% by weight of aluminum fluoride and calcium fluoride be added as the sintering aid with respect to a total of 100% by weight of the raw material powder comprising the aluminum-copper alloy powder, the electrolytic copper powder, the phosphorus-copper alloy powder, and the graphite powder. When the total blending amount of aluminum fluoride and calcium fluoride is less than 0.05% by weight, the effect as the sintering aid becomes insufficient, and hence a dense sintered compact having appropriate strength is not obtained. On the other hand, when the total blending amount of aluminum fluoride and calcium fluoride is more than 0.2% by weight, the effect as the sintering aid is not enhanced even when the blending amount is increased any more, and hence it is preferred that the total blending amount of aluminum fluoride and calcium fluoride be limited to 0.2% by weight or less from the viewpoint of cost.

It is preferred that a ratio d2/d1 of a mean grain diameter d1 of the aluminum-copper alloy powder and a mean grain diameter d2 of the electrolytic copper powder be set to from 2 to 3. When the ratio d2/d1 falls within this range, aluminum can be sufficiently diffused into copper, and corrosion resistance becomes excellent.

It is preferred that the electrolytic copper powder comprise powders having different shapes, and that a ratio W2/W1 of a proportion W1 of the electrolytic copper powder having an aspect ratio of 2 or more and a proportion W2 of the electrolytic copper powder having an aspect ratio of less than 2 be set to from 3 to 9. The electrolytic copper powder having an aspect ratio of 2 or more is effective for diffusing aluminum, but moldability becomes poor. It is not preferred that the ratio W2/W1 be less than 3 from the viewpoint of moldability. Meanwhile, it is not preferred that the ratio W2/W1 be more than 9 because the diffusion of aluminum becomes insufficient. The aspect ratio herein refers to a ratio obtained by dividing the long axis length of powder by the thickness thereof.

It is preferred that the graphite powder be obtained by granulating and pulverizing fine powder of natural graphite or artificial graphite with a resin binder to have a grain diameter of 145 mesh or less. In general, when 4% by weight or more of graphite is added, the resultant material cannot be molded. However, through use of granulated graphite, the material can be molded.

As a method of manufacturing a sintered bearing for an EGR valve according to a second embodiment of the present invention, there is provided a method of manufacturing a sintered bearing for an EGR valve, the sintered bearing comprising raw material powder comprising 9% by weight to 12% by weight of aluminum, 0.1% by weight to 0.6% by weight of phosphorus, 3% by weight to 10% by weight of graphite, and the balance comprising copper as a main component, and inevitable impurities, the method using aluminum-copper alloy powder, phosphorus-copper alloy powder, and graphite powder as the raw material powder without adding powder of a copper simple substance to the raw material powder, the method comprising at least: a molding step of molding a green compact having a sintering aid added to the raw material powder; a sintering step of obtaining, from the green compact, a sintered compact having a structure of an aluminum-copper alloy; and a sizing step of subjecting the sintered compact to dimension shaping. In this case, the description "without adding powder of a copper simple substance as the raw material powder" is used as the meaning of allowing powder of a copper simple substance contained inevitably on a manufacturing site.

The second embodiment of the present invention as the manufacturing method can also realize a method of manufacturing an aluminum bronze-based sintered bearing for an EGR valve, which has good productivity and low cost, and is thus suitable for mass production. Further, the sintered bearing for an EGR valve manufactured by the manufacturing method is excellent in abrasion resistance, corrosion resistance, and sliding characteristics in a high-temperature dry environment and can achieve compactness and reduction in cost. Further, powder of a copper simple substance is not added, and hence a portion in which the copper simple substance is concentrated does not substantially exist and the occurrence of corrosion due to such portion is avoided. In addition, corrosion resistance of each grain of aluminum-copper alloy powder is enhanced. Thus, corrosion resistance can be ensured even under severer use environment.

The aluminum-copper alloy powder serving as the raw material powder is preferably 7% by weight to 11% by weight of aluminum-copper alloy powder, more preferably, for example, 8% by weight to 10% by weight of aluminum-copper alloy powder. In those cases, corrosion resistance of each grain of the aluminum-copper alloy powder is enhanced so that corrosion resistance of the entire sintered bearing for an EGR valve is enhanced.

Effects of the Invention

The sintered bearing for an EGR valve according to the one embodiment of the present invention is excellent in abrasion resistance, corrosion resistance, and sliding characteristics in a high-temperature dry environment and can achieve compactness and reduction in cost. Further, the method of manufacturing a sintered bearing for an EGR valve according to the one embodiment of the present invention can realize a method of manufacturing an aluminum bronze-based sintered bearing for an EGR valve, which has good productivity and low cost, and is thus suitable for mass production.

Further, according to the second embodiment of the present invention as the manufacturing method using the aluminum-copper alloy powder without adding powder of a copper simple substance, a portion in which a copper simple substance is concentrated does not substantially exist and the occurrence of corrosion due to such portion is avoided. In addition, corrosion resistance of each grain of aluminum-copper alloy powder is enhanced. Thus, corrosion resistance can be ensured even under severer use environment.

EMBODIMENTS OF THE INVENTION

Now, a sintered bearing for an EGR valve according to a first embodiment of the present invention and a method of manufacturing the sintered bearing according to the first embodiment of the present invention are described with reference to the attached drawings. FIG. 1 to FIG. 7 are illustrations of the sintered bearing for an EGR valve according to the first embodiment, and FIG. 8 to FIG. 11 are illustrations of the manufacturing method according to the first embodiment.

Figure 1:
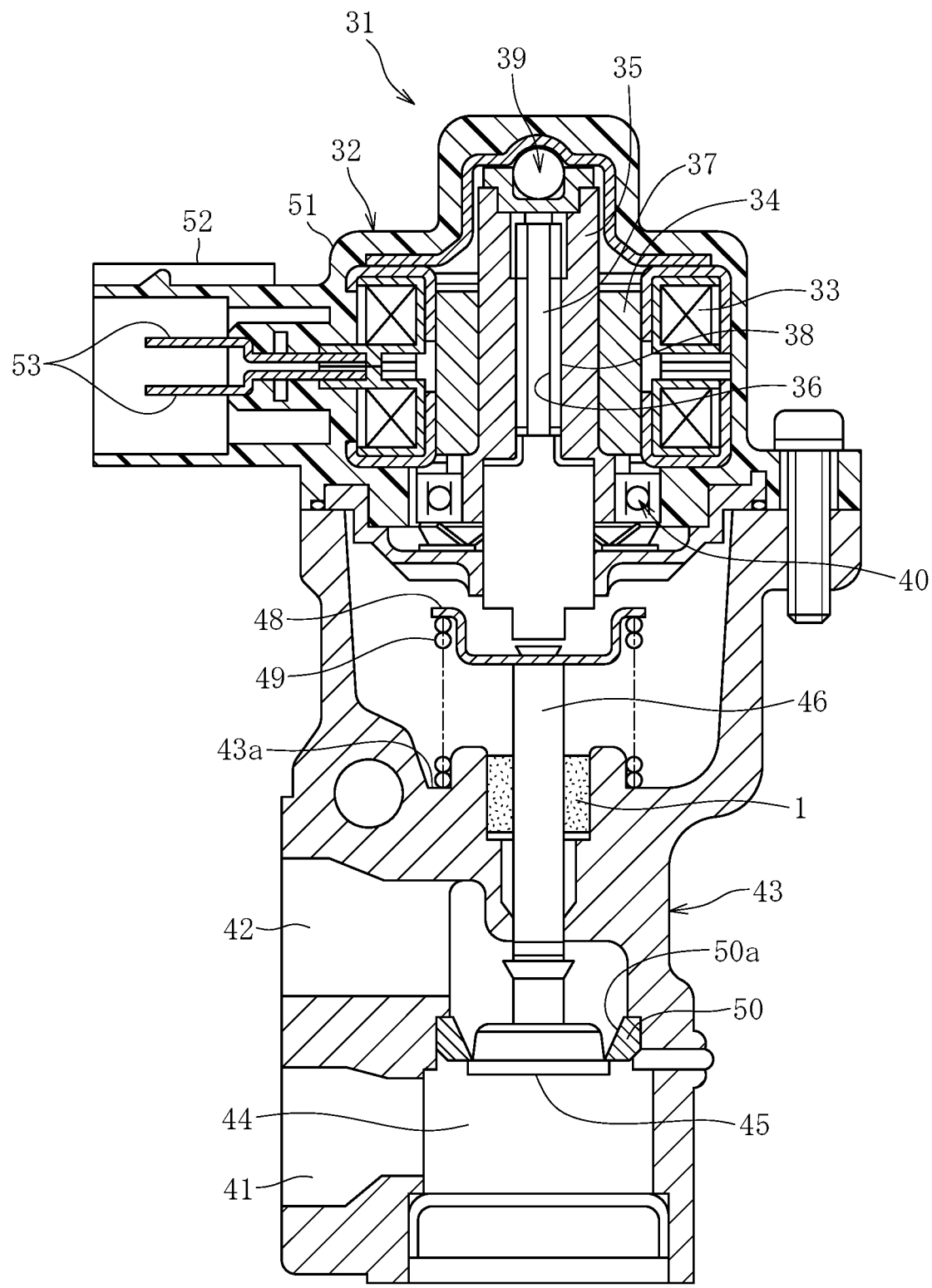
FIG. 1 is a vertical sectional view for illustrating an overview of an EGR valve in which a sintered bearing for an EGR valve according to a first embodiment of the present invention is used.

FIG. 1 is a vertical sectional view for illustrating an overview of an EGR valve in which the sintered bearing according to this embodiment is used. In an EGR apparatus (not shown), a part of exhaust gas to be discharged is recirculated as EGR gas to an intake system, and in order to regulate the flow rate of the EGR gas, an EGR valve 31 is used.

The EGR valve 31 comprises a housing 43, an EGR gas flow path 44 formed in the housing 43, a valve seat 50 arranged in the middle of the EGR gas flow path 44, a valve element 45 arranged so as to be brought into abutment against the valve seat 50, a shaft 46 arranged integrally with the valve element 45 and extending from the valve element 45, and a step motor 32 configured to move the shaft 46 in an axial direction thereof together with the valve element 45.

Both ends of the EGR gas flow path 44 formed in the housing 43 respectively serve as an inlet 41 through which the EGR gas is introduced and an outlet 42 through which the EGR gas is discharged. The valve seat 50 is arranged in the middle of the EGR gas flow path 44 and has a valve hole 50a communicating to the EGR gas flow path 44.

The shaft 46 is arranged between the step motor 32 and the valve element 45 so as to penetrate through the housing 43 in a vertical direction in the drawing sheet. The valve element 45 is fixed to a lower end of the shaft 46 and has a conical shape so that a conical surface thereof is brought into abutment against or is separated from the valve seat 50. A spring seat 48 is fixed to an upper end of the shaft 46. A compression coil spring 49 is mounted between the spring seat 48 and a spring seat portion 43a formed in the housing 43. The compression coil spring 49 is configured to urge the valve element 45 in such a direction that the valve element 45 is brought into abutment against the valve seat 50 to close the EGR flow path 44.

The shaft 46 is supported by a slide bearing 1 so as to be slidable in the vertical direction. The slide bearing 1 is incorporated into a radially inner hole formed in the housing 43 and slidably fitted with a radially outer surface of the shaft 46. The slide bearing 1 corresponds to the sintered bearing for an EGR valve according to this embodiment. The detail thereof is described later.

The step motor 32 has a configuration in which a cylindrical rotor 35 is arranged on a radially inner side of a stator 34 having an exciting coil 33 mounted on a slot, and a cylindrical magnet having an N-pole and an S-pole magnetized alternately is mounted on an outer periphery of the rotor 35. The rotor 35 is rotatably supported by a pivot bearing 39 arranged on an upper end portion and a radial bearing 40 arranged on a lower end portion. A female thread 36 is formed on a radially inner portion of the rotor 35, and an output shaft 37 having a male thread 38 to be engaged with the female thread 36 is arranged on a radially inner side of the rotor 35. Rotary motion of the rotor 35 is converted into vertical motion of the output shaft 37 via the female thread 36 and the male thread 38. A connector 52 protruding laterally is formed integrally with a casing 51 of the step motor 32, and terminals 53 extending from the exciting coil are arranged.

An electronic control part on an engine side sends a control signal to the step motor 32, and based on the operation amount of the step motor 32 corresponding to the control signal, the shaft 46 is lowered against the urging force of the compression coil spring 49, to thereby open the valve element 45. Thus, the EGR gas regulated in flow rate is returned to the intake side on the engine side through the EGR gas flow path 44 (not shown).

The EGR valve 31 is arranged in the vicinity of a combustion chamber of an engine and may be exposed to a high-temperature environment reaching a temperature as high as 300° C. or more along with increase in engine heat generation amount involved in increase in output power. Due to such use conditions and environment, the sintered bearing 1 for an EGR valve according to this embodiment, which is configured to support the shaft 46 so as to be slidable in the vertical direction in the drawing sheet, is required to have corrosion resistance, abrasion resistance, and sliding characteristics in a high-temperature dry environment.

Figure 2:
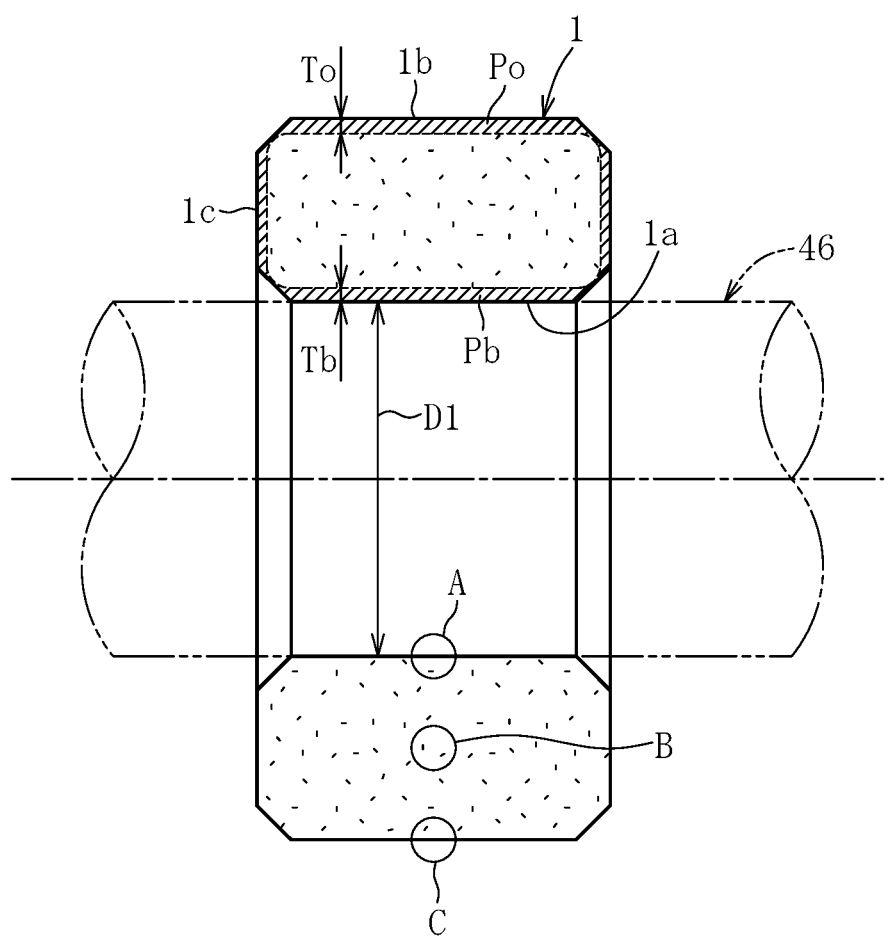
FIG. 2 is a vertical sectional view of the sintered bearing for an EGR valve according to the first embodiment of the present invention and a sintered bearing for an EGR valve manufactured by a manufacturing method according to the first embodiment of the present invention.

FIG. 2 is a vertical sectional view of the sintered bearing for an EGR valve according to this embodiment. The sintered bearing 1 for an EGR valve (hereinafter sometimes referred to simply as "sintered bearing") is formed into a cylindrical shape having a bearing surface 1a on an inner periphery thereof. The shaft 46 (see FIG. 1) having the valve element 45 is inserted into the inner periphery of the sintered bearing 1. The shaft 46 is supported by the bearing 1 so as to be slidable in the axial direction in a high-temperature dry environment.

The sintered bearing 1 for an EGR valve according to this embodiment is formed by filling a mold with raw material powder obtained by mixing various powders, compressing the raw material powder to mold a green compact, and then sintering the green compact.

The raw material powder is mixed powder obtained by mixing aluminum-copper alloy powder, copper powder, phosphorus-copper alloy powder, graphite powder, and aluminum fluoride and calcium fluoride serving as a sintering aid. The detail of each powder is described below.

[Aluminum-Copper Alloy Powder]

Aluminum (40% by weight to 60% by weight)-copper alloy powder is pulverized to adjust a grain size thereof. The aluminum-copper alloy powder has a grain diameter of 100 μm or less and a mean grain diameter of 35 μm. The term "mean grain diameter" as used herein refers to a mean value of grain diameters measured with laser diffraction. Specifically, the mean grain diameter is intended to refer to a mean value of grain diameters when 5,000 grains of powder is measured with laser diffraction by SALD-3100 manufactured by Shimadzu Corporation.

Through use of the aluminum-copper alloy powder, the effects of additives, such as graphite and phosphorus, can be attained, and a sintered bearing material becomes excellent in corrosion resistance, strength, sliding characteristics, and the like. Further, the aluminum-copper alloy powder is alloyed powder, and hence there is no handling problem involved in flying of aluminum simple substance powder having a small specific gravity.

An α-phase of an aluminum bronze structure is most excellent in corrosion resistance to sulfidation corrosion and organic acid corrosion. Through use of the aluminum (40% by weight to 60% by weight)-copper alloy powder, a sintered bearing with strength can be manufactured even when graphite is added. A γ-phase of the structure is excellent in abrasion resistance but is poor in organic acid corrosion resistance. It is preferred that, in the aluminum bronze structure, a ratio γ-phase/α-phase of the γ-phase to the α-phase be $0.10 \leq \gamma\text{-phase}/\alpha\text{-phase} \leq 0.25$. It is not preferred that the ratio γ-phase/α-phase be less than 0.10 because abrasion resistance is degraded. Meanwhile, it is not preferred that the ratio γ-phase/α-phase be more than 0.25 because organic acid corrosion resistance is degraded.

[Copper Powder]

As the copper powder, there are given atomized powder, electrolytic powder, and pulverized powder. However, in order to sufficiently diffuse aluminum into copper, dendritic electrolytic powder is effective and is excellent in moldability, sintering property, and sliding characteristics. Therefore, in this embodiment, electrolytic powder was used as the copper powder. Further, in order to sufficiently diffuse aluminum into copper, it is preferred that two kinds of electrolytic copper powders having different powder shapes be used, and that a ratio W2/W1 of a proportion W1 of the electrolytic copper powder having an aspect ratio of 2 or more and a proportion W2 of the electrolytic copper powder having an aspect ratio of less than 2 be set to from 3 to 9. The electrolytic copper powder having an aspect ratio of 2 or more is effective for diffusing aluminum but has poor moldability. It is not preferred that the ratio W2/W1 be less than 3 from the viewpoint of moldability. Meanwhile, it is not preferred that the ratio W2/W1 be more than 9 because the diffusion of aluminum becomes insufficient.

In this embodiment, the electrolytic copper powder having a mean grain diameter of 85 μm was used. It is preferred that a ratio d2/d1 of a mean grain diameter d1 of the above-mentioned aluminum-copper alloy powder and a mean grain diameter d2 of the electrolytic copper powder be set to from 2 to 3. When the ratio d2/d1 falls within such range, aluminum can be sufficiently diffused into copper, and corrosion resistance becomes excellent. Therefore, in this embodiment, the mean grain diameter d1 of the aluminum-copper alloy powder was set to 35 μm, and the mean grain diameter d2 of the electrolytic copper powder was set to 85 μm. Note that, the grain diameter is not limited thereto, and the aluminum-copper alloy powder having a mean grain diameter of about from 20 μm to 65 μm can be used, and the electrolytic copper powder having a grain diameter of 200 μm or less and a mean grain diameter of about from 60 μm to 120 μm can be used.

[Phosphorus Alloy Powder]

As the phosphorus alloy powder, phosphorus (7% by weight to 10% by weight)-copper alloy powder was used. Phosphorus has the effect of enhancing wettability between a solid phase and a liquid phase during sintering. It is preferred that the blending amount of phosphorus be from 0.1% by weight to 0.6% by weight, specifically 0.1% by weight to 0.4% by weight. When the blending amount of phosphorus is less than 0.1% by weight, the accelerating effect on the sintering between the solid phase and the liquid phase is unsatisfactory. Meanwhile, when the blending amount of phosphorus is more than 0.6% by weight, that is, more than 0.4% by weight, which is a preferred value, the sintering proceeds excessively, and aluminum is segregated to increase the precipitation of a γ-phase, with the result that a sintered compact becomes brittle.

[Graphite Powder]

Graphite is present mainly as free graphite in pores dispersed and distributed in a substrate and contributes to the enhancement of abrasion resistance by imparting excellent lubricity to a sintered bearing. The blending amount of graphite is preferably from 3% by weight to 10% by weight, more preferably from 6% by weight to 10% by weight. When the blending amount of graphite is less than 6% by weight, the effect of enhancing lubricity and abrasion resistance through the addition of graphite is not attained easily in the sintered bearing for an EGR valve in a high-temperature dry environment. When the blending amount of graphite is less than 3% by weight, the effect of enhancing lubricity and abrasion resistance through the addition of graphite is not attained in the sintered bearing for an EGR valve in a high-temperature dry environment. Meanwhile, it is not preferred that the blending amount of graphite be more than 10% by weight because the material strength is decreased, and the diffusion of aluminum into copper is inhibited. In general, when 4% by weight or more of graphite is added, the resultant material cannot be molded. However, through use of granulated graphite, the material can be molded. In this embodiment, the graphite powder obtained by granulating and pulverizing fine powder of natural graphite or artificial graphite with a resin binder to a grain diameter of 145 mesh or less was used.

[Aluminum Fluoride and Calcium Fluoride]

An aluminum oxide film to be generated on a surface of aluminum-copper alloy powder during sintering inhibits the sintering remarkably. However, aluminum fluoride and calcium fluoride serving as the sintering aid gradually evaporate while being melted at a sintering temperature of from 850° C. to 900° C. of the aluminum-copper alloy powder and protect the surface of the aluminum-copper alloy powder to suppress the generation of aluminum oxide, thereby accelerating the sintering to increase the diffusion of aluminum. Aluminum fluoride and calcium fluoride evaporate and volatilize during sintering, and hence hardly remain in a finished product of the sintered bearing.

It is preferred that a total of about 0.05% by weight to about 0.2% by weight of aluminum fluoride and calcium fluoride be added as the sintering aid with respect to a total of 100% by weight of the raw material powder comprising aluminum, phosphorus, graphite, and the balance comprising copper as a main component, and inevitable impurities. When the addition amount of aluminum fluoride and calcium fluoride is less than 0.05% by weight, the effect thereof as the sintering aid becomes insufficient, and hence a dense sintered compact having appropriate strength is not obtained. Meanwhile, when the addition amount of aluminum fluoride and calcium fluoride is more than 0.2% by weight, the effect thereof as the sintering aid is not attained any more even when aluminum fluoride and calcium fluoride are added more. Therefore, it is preferred that the addition amount be 0.2% by weight or less from the viewpoint of cost.

In the sintered bearing for an EGR valve according to this embodiment and the method of manufacturing the sintered bearing as described later, aluminum-copper alloy powder, electrolytic copper powder, phosphorus alloy powder, and graphite powder were mixed at such a ratio that the content of aluminum was from 9% by weight to 12% by weight, the content of phosphorus was from 0.1% by weight to 0.4% by weight, the content of graphite was 6% by weight to 10% by weight, and the balance comprised copper as a main component, to thereby obtain raw material powder. As the sintering aid, a total of 0.05% by weight to 0.2% by weight of aluminum fluoride and calcium fluoride was added, and 0.1% by weight to 1% by weight of a lubricant, such as zinc stearate or calcium stearate, was added so as to enhance moldability with respect to a total of 100% by weight.

Specifically, for example, in the sintered bearing for an EGR valve according to this embodiment and the method of manufacturing the sintered bearing as described later, aluminum-copper alloy powder, electrolytic copper powder, phosphorus alloy powder, and graphite powder were mixed at such a ratio that the content of aluminum was from 9 parts by weight to 12 parts by weight, the content of phosphorus was from 0.1 part by weight to 0.4 part by weight, the content of graphite was 6 parts by weight to 10 parts by weight, and the balance comprised copper as a main component, to thereby obtain raw material powder. As the sintering aid, a total of 0.05 part by weight to 0.2 part by weight of aluminum fluoride and calcium fluoride was added, and 0.1 part by weight to 1 part by weight of a lubricant, such as zinc stearate or calcium stearate, was added so as to enhance moldability with respect to a total of 100 parts by weight.

It is preferred that the blending amount of phosphorus be from 0.1 part by weight to 0.6 part by weight, specifically from 0.1 part by weight to 0.4 part by weight. When the blending amount of phosphorus is less than 0.1 part by weight, the accelerating effect on the sintering between the solid phase and the liquid phase is unsatisfactory. Meanwhile, when the blending amount of phosphorus is more than 0.6 part by weight, that is, more than 0.4 part by weight, which is a preferred value, the sintering proceeds excessively, and aluminum is segregated to increase the precipitation of a γ-phase, with the result that a sintered compact becomes brittle.

The blending amount of graphite is preferably from 3 parts by weight to 10 parts by weight, more preferably from 6 parts by weight to 10 parts by weight. When the blending amount of graphite is less than 6 parts by weight, the effect of enhancing lubricity and abrasion resistance through the addition of graphite is not attained easily in the sintered bearing for an EGR valve in a high-temperature dry environment. When the blending amount of graphite is less than 3 parts by weight, the effect of enhancing lubricity and abrasion resistance through the addition of graphite is not attained in the sintered bearing for an EGR valve in a high-temperature dry environment. Meanwhile, it is not preferred that the blending amount of graphite is more than 10 parts by weight because the material strength is decreased, and the diffusion of aluminum into copper is inhibited. In general, when 4 parts by weight or more of graphite is added, the resultant material cannot be molded. However, through use of granulated graphite, the material can be molded.

In the sintered bearing 1, both a radially outer surface 1b of the bearing and the bearing surface 1a on the radially inner side are subjected to sizing processing after sintering in a manufacturing method described later. Therefore, the radially inner portion and the radially outer portion are corrected to enhance accuracy. Further, the surface roughness of the radially inner surface becomes satisfactory to enhance sliding characteristics.

In FIG. 2, a compressed layer in a surface layer of the sintered bearing 1 is illustrated with hatching. Hatching is provided only to an upper half in a radial direction of the bearing 1, and hatching is omitted in a lower half thereof. The surface layer of the sintered bearing 1 has a compressed layer. A density ratio αo of a compressed layer Po in the surface layer on the radially outer surface 1b side and a density ratio αb of a compressed layer Pb in the surface layer on the bearing surface 1a side are both higher than a density ratio αi of the inside, and both of the density ratios αo and αb are set in a range of 80%≤αo and αb≤95%. It is not preferred that the density ratios αo and αb be less than 80% because the bearing strength becomes insufficient. On the other hand, it is not preferred that the density ratios αo and αb be more than 95% because a residual stress due to the correction becomes significant to cause a risk in that the stress is released at high temperature to cause strain.

In addition, when an average value of depths of the compressed layer Po in the surface layer on the radially outer surface 1b side is defined as To, an average value of depths of the compressed layer Pb in the surface layer on the bearing surface 1a side is defined as Tb, and ratios of To and Tb to an inner diameter dimension D1 of the bearing surface are defined as To/D1 and Tb/D1, respectively, it is preferred that relationships of 1/100≤To/D1 and Tb/D1≤1/15 be satisfied. Herein, the density ratio α is represented by the following expression:

$$\alpha(\%) = (\rho 1 / \rho 0) \times 100$$

where ρ1 represents a density of a porous body, and ρ0 represents a density on the assumption that the porous body has no micropores. It is not preferred that To/D1 and Tb/D1 be less than 1/100 because pores are crushed insufficiently. On the other hand, it is not preferred that To/D1 and Tb/D1 be more than 1/15 because pores are crushed excessively.

Next, the results of verification for achieving this embodiment are described with reference to FIG. 3 to FIG. 7. Material blending specifications of a related-art bronze-based standard product and prototypes 1 to 3 according to this embodiment in FIG. 3 to FIG. 7 are shown in Table 1.

TABLE 1

| | Blending amount (% by weight) | | | | |
|---|---|---|---|---|---|
| | Cu | Sn | Al | P | C |
| Bronze-based product | Balance | 10 | — | — | 1 |
| Prototype 1 | Balance | — | 10 | 0.2 | 6 |
| Prototype 2 | Balance | — | 10 | 0.2 | 8 |
| Prototype 3 | Balance | — | 10 | 0.2 | 10 |

Figure 3:
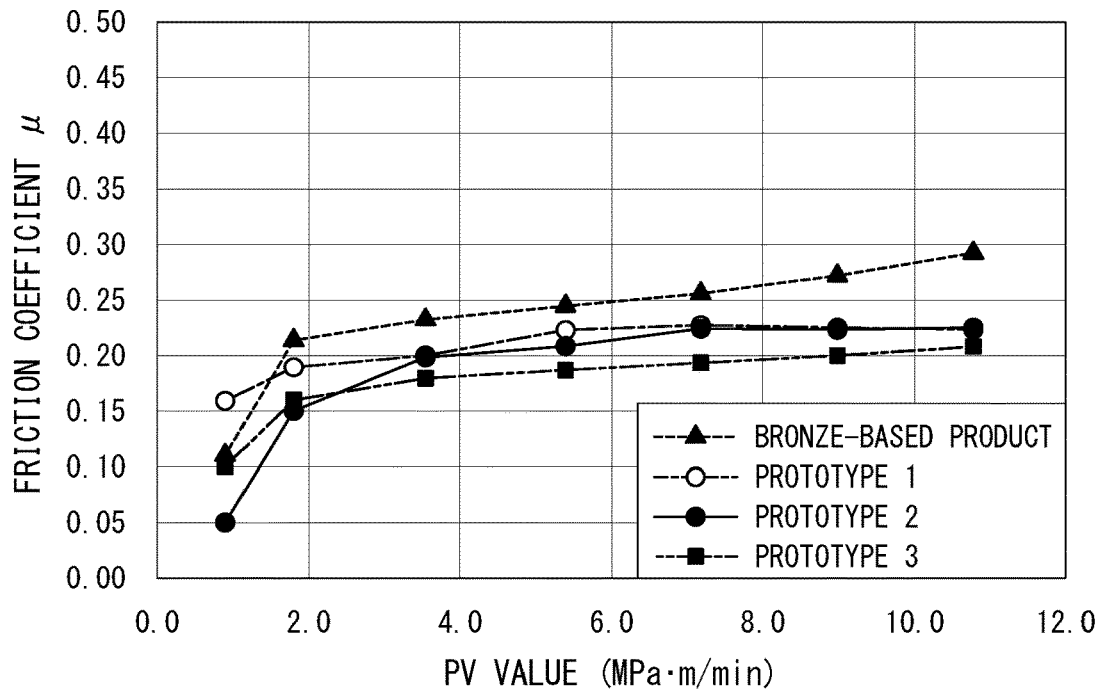
FIG. 3 is a graph for showing results of a torque test.
Figure 4:
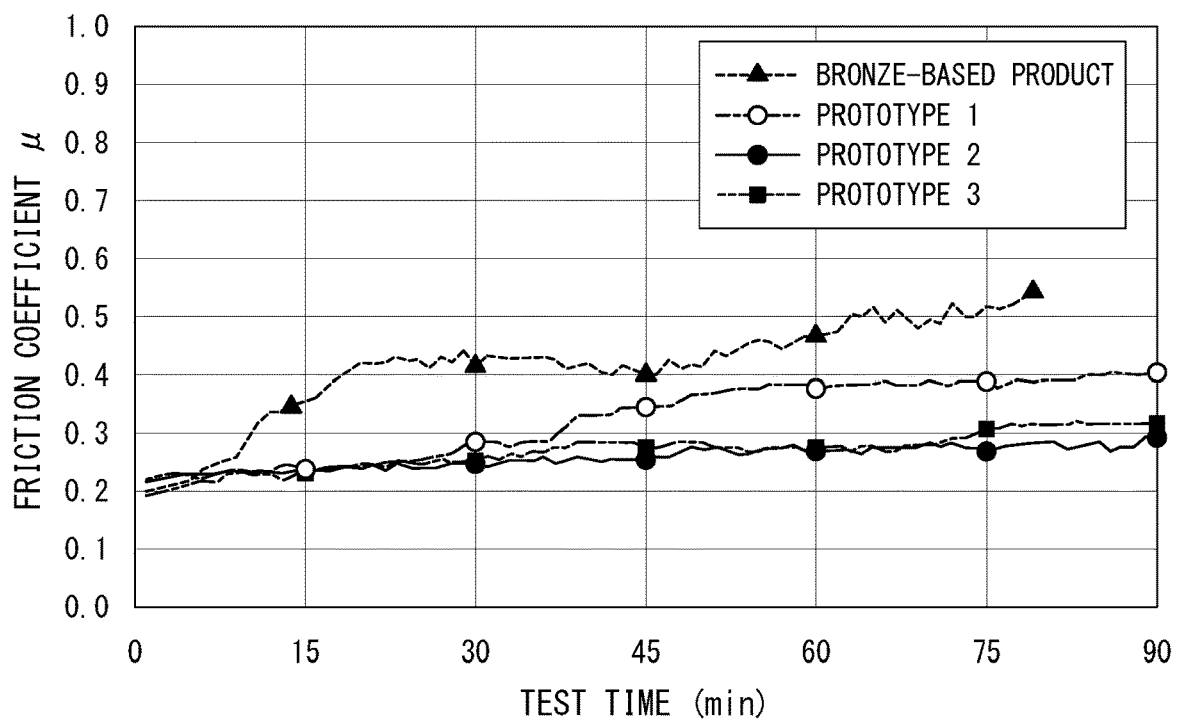
FIG. 4 is a graph for showing results of a torque test.

Results of torque tests of the bronze-based standard product and the prototypes are shown in FIG. 3 and FIG. 4. The results of a torque test (1) are shown in FIG. 3, and the results of a torque test (2) are shown in FIG. 4. Both the torque tests (1) and (2) were conducted in an oilless and non-oil impregnation (dry) state. The atmosphere temperature was set to normal temperature. It is considered that, in the dry environment, the sliding characteristics of an EGR valve in a high-temperature environment (about 350° C.) and the sliding characteristics thereof at normal temperature tend to be similar. Further, focusing on the fact that a general aluminum blending amount (from 9% by weight to 11% by weight) in the aluminum bronze sintered bearing was applicable under use conditions in the dry environment, each test was conducted by changing the addition amount of graphite while fixing the blending amount of aluminum to 10% by weight, which was a medium value, in the prototypes 1 to 3.

[Torque Test (1)]

The load was added every 5 minutes while the number of rotations was fixed. Specific test conditions are as follows.

TABLE 2

| Load (N) | 5 | 10 | 20 | 30 | 40 | 50 | 60 |
|---|---|---|---|---|---|---|---|
| Rotation speed (m/min) | | | | 6.6 | | | |
| PV value (MPa · m/min) | 0.9 | 1.8 | 3.6 | 5.4 | 7.2 | 9.0 | 10.8 |

From the torque test results shown in FIG. 3, in the dry environment, any of the prototypes 1 to 3 have a friction coefficient lower than that of the bronze-based standard product and are excellent in sliding characteristics. Further, it was found that there was a tendency that the friction coefficient was decreased as the addition amount of graphite was increased.

[Torque Test (2)]

The torque test (2) was conducted by applying a load of 60 N in the above-mentioned torque test (1) and then continuing the torque test for about 90 minutes while keeping the load and number of rotations. In the same way as in the torque test (1), as shown in FIG. 4, any of the prototypes 1 to 3 have a friction coefficient lower than that of the bronze-based standard product and are excellent in sliding characteristics. In particular, it was found that, in the prototype 1 and the prototype 2 in which the addition amount of graphite was set to 8% by weight or more, increase in friction coefficient was suppressed even after an elapse of the test time.

[Block-On-Ring Test]

Block-like test pieces were manufactured in material blending specifications of the bronze-based standard product and the prototypes 1 to 3, and the abrasion resistance thereof was evaluated through use of a block-on-ring tester.

Figure 5:
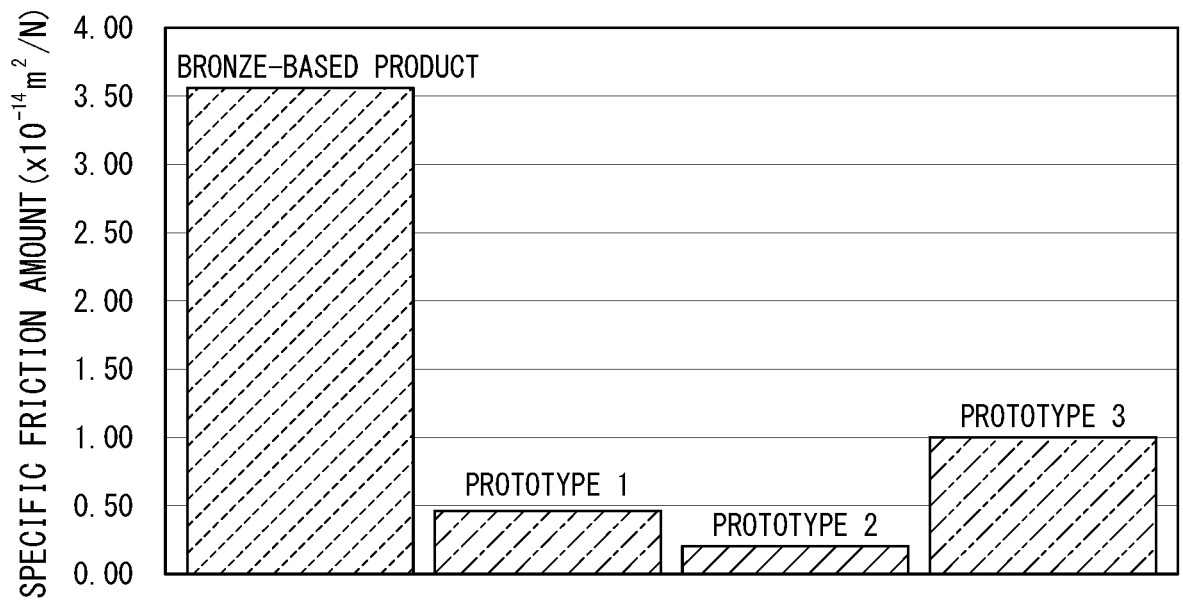
FIG. 5 is a graph for showing test results of abrasion resistance.

<Test Conditions>
Tester: Block-on-ring tester [manufactured by NTN Corporation]
Load: 14.7 N
Rotation speed: 430 rpm (54.0 m/min)
Test time: 60 min
Lubrication method: oilless and non-oil impregnation (dry)
Counterpart material: material: SUS420J2 through-hardening (hardness: HV 550 to HV 650), rotation diameter (outer diameter) and width: (φ40 mm in outer diameter×4 mm in width, surface roughness: 0.02 μmRa as target value The results of the block-on-ring test are shown in FIG. 5. In this test, the atmosphere temperature was set to normal temperature, and it is considered that the tendency of abrasion resistance of an EGR valve in this case is similar to that of an EGR valve in a high-temperature dry environment. From the test results, it was understood that the abrasion of any of the prototypes 1 to 3 was smaller than that of the bronze-based standard product, and the prototypes 1 to 3 were excellent in abrasion resistance. The prototype 2 in which the addition amount of graphite was set to 8% by weight is most excellent in abrasion resistance. The abrasion amount of the prototype 3, in which the addition amount of graphite was set to 10% by weight, was increased. The reason for this is considered as follows. The addition amount of graphite was large. Therefore, the material strength was slightly decreased so that the material was easily chipped off. From the test results, it was understood that the addition amount of graphite usable in the bearing for an EGR valve was from 3% by weight to 10% by weight, preferably from 6% by weight to 10% by weight.

[Organic Acid Corrosion Test]

Test pieces were manufactured in material blending specifications of the bronze-based standard product and the prototypes 1 to 3, and an organic acid corrosion test was conducted. In an evaluation method, each test piece was immersed in a corrosion solution and left to stand in a high-temperature tank at 60° C. for a predetermined period of time. After standing, each test piece was taken out from the solution and dried for 1 hour. After drying, the weight of each test piece was measured, and weight change rates calculated based on the measurement values were compared with each other. The weight change rates were compared with each other in terms of a maximum value and a minimum value of the weight change rates of five test pieces as well as an average value thereof. Specific test conditions are as follows.

<Test Conditions>
Test piece size: φ6 mm in inner diameter×φ12 mm in outer diameter×6 mm in width
Number of test pieces: five
Corrosion solution: aqueous solution containing 1% formic acid and 1% acetic acid
Atmosphere temperature: 60° C.

Figure 6:
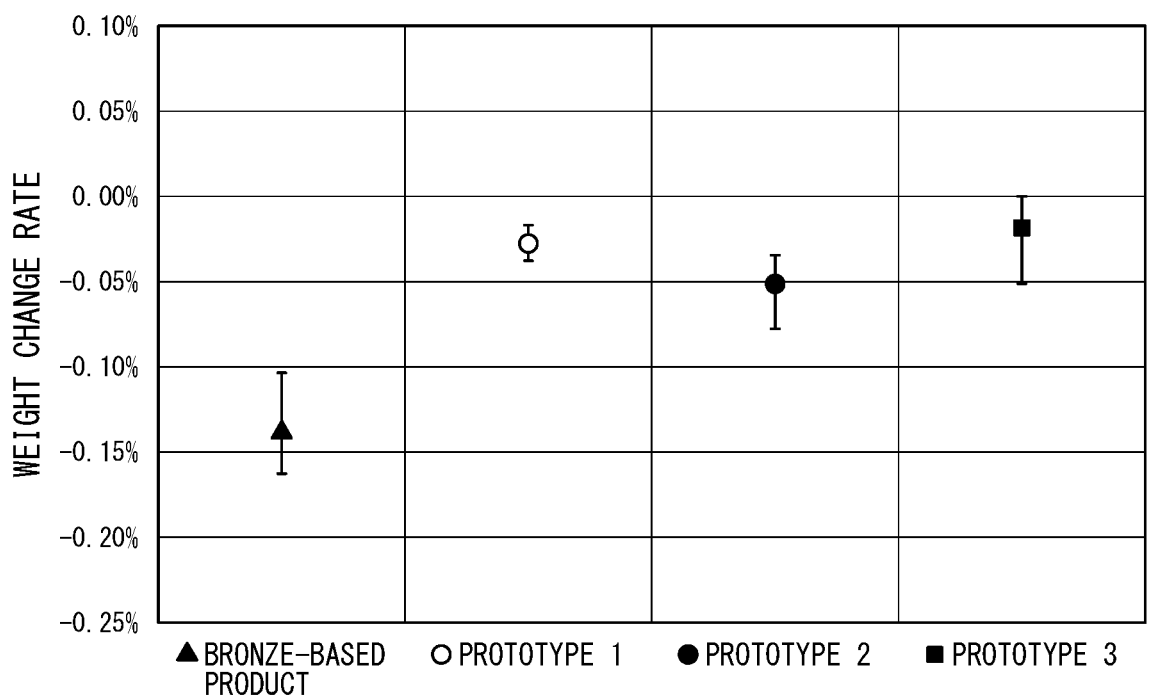
FIG. 6 is a graph for showing test results of corrosion resistance.

Weight change rates after standing for 24 hours are shown in FIG. 6. The weight change rates of any of the prototypes 1 to 3 were smaller than that of the bronze-based standard product. In particular, the weight change rate of the prototype 3 in which the addition amount of graphite was set to 10% by weight was smallest.

Figure 7:
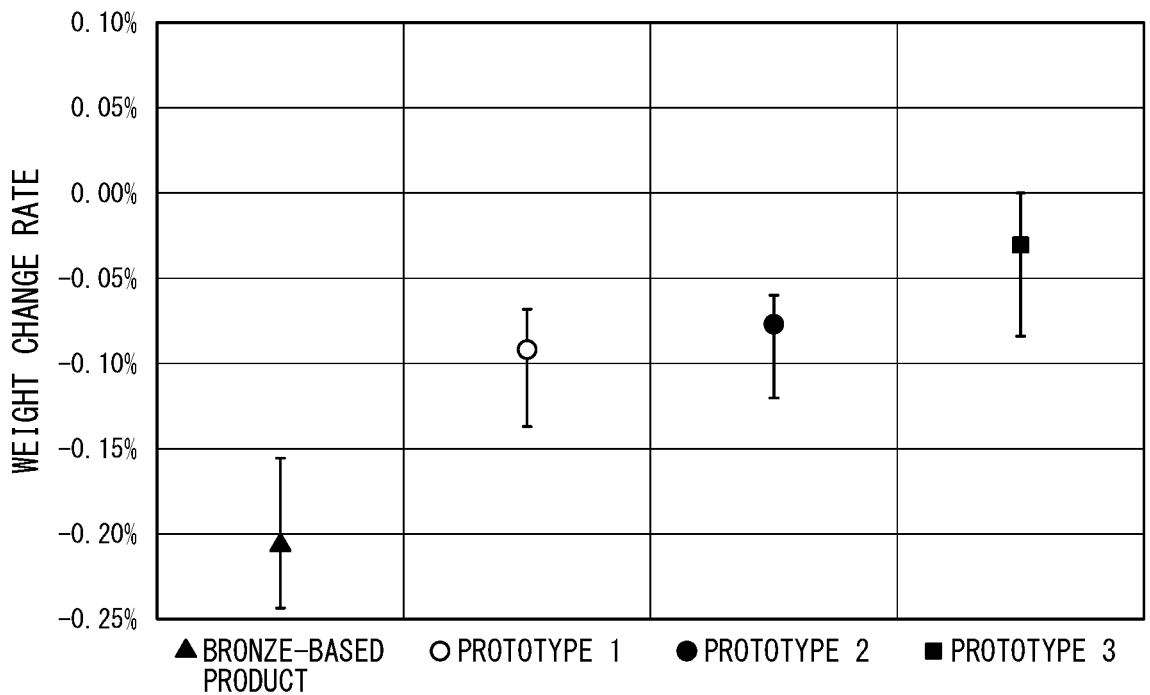
FIG. 7 is a graph for showing test results of corrosion resistance.

Weight change rates after standing for 72 hours are shown in FIG. 7. The weight change rates of any of the prototypes 1 to 3 were smaller than that of the bronze-based standard product. The weight change rate of the prototype 3 in which the addition amount of graphite was set to 10% by weight was smallest. Compared to the results after standing for 24 hours, a change was hardly observed.

From the test results shown in FIG. 3 to FIG. 7, it was confirmed that the usable range of the addition amount of graphite in the sintered bearing for an EGR valve to be used in a high-temperature dry environment was from 3% by weight to 10% by weight, preferably from 6% by weight to 10% by weight. Further, also from the viewpoint of sintering, it is not preferred that the addition amount of graphite be more than 10% by weight because the diffusion of aluminum into copper is inhibited.

As described above, the blending amount of aluminum was set to from 9% by weight to 11% by weight. However, in total consideration of the fact that the diffusion of aluminum into copper is inhibited by increase in amount of graphite together with the test results of FIG. 3 to FIG. 7, it was found that the upper limit of the blending amount of aluminum was preferably 12% by weight in the sintered bearing for an EGR valve.

The results obtained by measuring the hardness of the sintered bearing for an EGR valve according to the first embodiment are shown in Table 3. Values of the hardness shown in Table 3 are obtained by carrying out evaluations based on Vickers hardness (Hv) under a test load of 25 g. The values of the hardness are described below as those based on the Vickers hardness (Hv). Further, the hardness of a copper-based sintered bearing for comparison was also shown as Comparative Example 1.

TABLE 3

| | Measurement position | Hardness (Hv) | | |
|---|---|---|---|---|
| Example 1 | α-phase | 120 | 135 | 140 |
| | γ-phase | 200 | 210 | 220 |
| Comparative Example 1 | Bronze phase | 80 | 70 | 75 |

As shown in Table 3, the hardness of the copper-based sintered bearing is approximately from 70 to 80, whereas the hardness of the sintered bearing for an EGR valve according to the first embodiment is, for example, approximately from 120 to 220. From those results, it can be determined that the sintered bearing for an EGR valve according to the first embodiment is a sintered bearing that is more excellent in abrasion resistance than the copper-based sintered bearing. The reason for this is as follows. The hardness of the α-phase that is a soft phase is approximately from 120 to 140, and the hardness of the γ-phase that is a hard phase is approximately from 200 to 220. Thus, the hardness of any phase of the sintered bearing for an EGR valve according to the first embodiment is higher than that of the copper-based sintered bearing.

Figure 8:
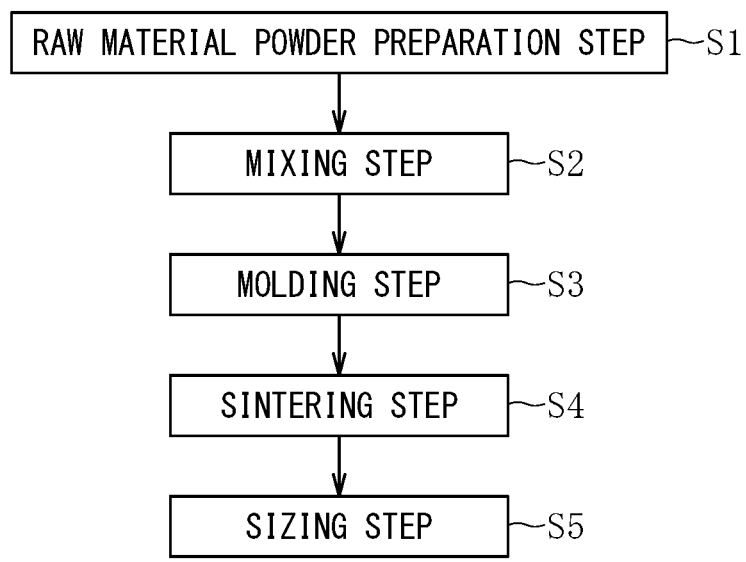
FIG. 8 is a diagram for illustrating manufacturing steps of the sintered bearing for an EGR valve of FIG. 2.

Next, the method of manufacturing a sintered bearing for an EGR valve according to the first embodiment is described. A sintered bearing for an EGR value is manufactured through a raw material powder preparation step S1, a mixing step S2, a molding step S3, a sintering step S4, and a sizing step S5 as illustrated in FIG. 8.

[Raw Material Powder Preparation Step S1]

In the raw material powder preparation step S1, raw material powder of the sintered bearing 1 is prepared and generated. The raw material powder was prepared and generated by adding a total of 0.05% by weight to 0.2% by weight of aluminum fluoride and calcium fluoride serving as the sintering aid, and 0.1% by weight to 1% by weight of a lubricant, such as zinc stearate or calcium stearate, for enhancing moldability of graphite powder with respect to a total of 100% by weight of 18% by weight to 24% by weight of aluminum (40% by weight to 60% by weight)-copper alloy powder, 2% by weight to 4% by weight of phosphorus (7% by weight to 10% by weight)-copper alloy powder, 6% by weight to 10% by weight of graphite powder, and the balance comprising electrolytic copper powder. By adding the lubricant, a green compact as described later can be released smoothly, and the deformation of the green compact due to the release can be prevented.

For example, the content of aluminum is set to, for example, 8.5% by weight or more and 10% by weight or less, specifically, 9% by weight or more and 9.5% by weight or less with respect to a total of 100% by weight of 18% by weight to 24% by weight of aluminum (40% by weight to 60% by weight)-copper alloy powder, 2% by weight to 4% by weight of phosphorus (7% by weight to 10% by weight)-copper alloy powder, 6% by weight to 10% by weight of graphite powder, and the balance comprising electrolytic copper powder.

For example, the raw material powder can be used, which is obtained by adding a total of 0.05 part by weight to 0.2 part by weight of aluminum fluoride and calcium fluoride serving as the sintering aid, and 0.1 part by weight to 1 part by weight of a lubricant, such as zinc stearate or calcium stearate, for enhancing moldability of graphite powder with respect to a total of 100 parts by weight of 18 parts by weight to 24 parts by weight of aluminum (40% by weight to 60% by weight)-copper alloy powder, 2 parts by weight to 4 parts by weight of phosphorus (7% by weight to 10% by weight)-copper alloy powder, 3 parts by weight to 10 parts by weight, preferably 6 parts by weight to 10 parts by weight of graphite powder, and the balance comprising electrolytic copper powder.

For example, the content of aluminum is set to, for example, 8.5 parts by weight or more and 10 parts by weight or less, specifically, 9 parts by weight or more and 9.5 parts by weight or less with respect to a total of 100 parts by weight of 18 parts by weight to 24 parts by weight of aluminum (40% by weight to 60% by weight)-copper alloy powder, 2 parts by weight to 4 parts by weight of phosphorus (7% by weight to 10% by weight)-copper alloy powder, 6 parts by weight to 10 parts by weight of graphite powder, and the balance comprising electrolytic copper powder.

[Mixing Step S2]

Figure 9:
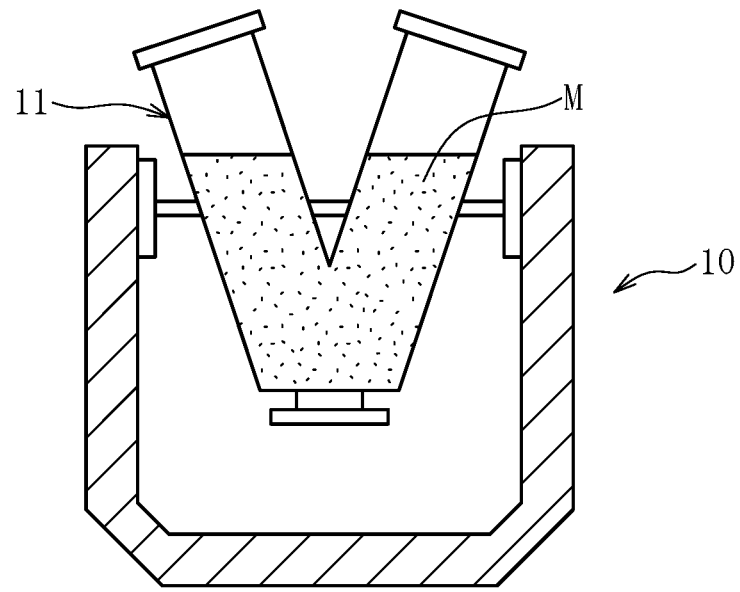
FIG. 9 is a schematic view of a mixer for raw material powder.
Figure 10:
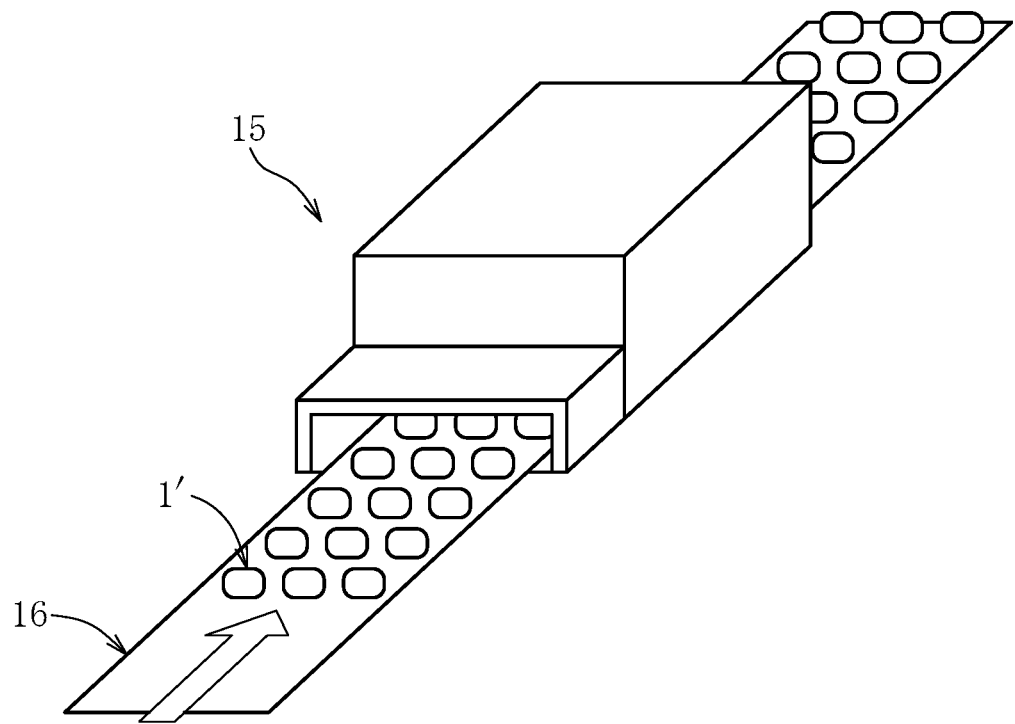
FIG. 10 is a schematic view of a mesh-belt type continuous furnace.

The above-mentioned raw material powder M is supplied to, for example, a can body 11 of a V-shaped mixer 10 illustrated in FIG. 9, and is homogeneously mixed by rotating the can body 11.

[Molding Step S3]

In the molding step S3, the above-mentioned raw material powder is compressed to form a green compact having a shape of the sintered bearing 1. The green compact is subjected to compression molding so that a sintered compact to be formed by heating at a sintering temperature or more has a density ratio α of from 70% to 80%.

Specifically, for example, a mold having a cavity with a shape similar to that of a green compact is set on a CNC press machine using a servo motor as a drive source. The above-mentioned raw material powder filling the cavity is compressed with a pressurization force of from 200 MPa to 700 MPa to mold the green compact. During molding of the green compact, the mold may be heated to 70° C. or more.

In the method of manufacturing the sintered bearing 1 for an EGR valve according to this embodiment, the problem of shortage of strength of a green compact caused by decrease in moldability due to fluidity is solved by using aluminum-copper alloy powder as an aluminum source, and in this case, there arises no problem of handling due to scattering of aluminum simple substance particles having a small specific gravity. Further, the manufacturing method has good production efficiency and hence is suitable for mass production.

[Sintering Step S4]

In the sintering step S4, the green compact is heated at a sintering temperature and the raw material powders adjacent to each other are bound by sintering to form the sintered compact. Through use of a mesh-belt type continuous furnace 15 illustrated in FIG. 10, a green compact 1' is supplied in a large amount to a mesh belt 16 of the mesh-belt type continuous furnace 15, to thereby form the sintered compact. Thus, stable quality and manufacturing method can be realized.

What is important in the sintering step is to enhance corrosion resistance by sufficiently diffusing aluminum into copper, and to enhance corrosion resistance and bearing performance by setting an aluminum bronze structure to the α-phase. When the aluminum bronze structure is the γ-phase, although abrasion resistance is excellent by virtue of the increased hardness, organic acid corrosion resistance is degraded. Therefore, it was found necessary to reduce the amount of aluminum so as to minimize the precipitation of the γ-phase.

Further, it was found preferable that, in the aluminum structure, the ratio γ-phase/α-phase of the γ-phase and the α-phase be set to $0.10 \leq \gamma\text{-phase}/\alpha\text{-phase} \leq 0.25$. It is not preferred that the ratio γ-phase/α-phase be less than 0.10 because abrasion resistance is degraded. Meanwhile, it is not preferred that the ratio γ-phase/α-phase be more than 0.25 because organic acid corrosion resistance is degraded.

As the sintering condition satisfying the foregoing, the sintering temperature is preferably from 900° C. to 950° C., more preferably from 900° C. to 920° C. (for example, 920° C.). Further, as atmospheric gas, hydrogen gas, nitrogen gas, or mixed gas thereof is used. As the sintering time is longer, corrosion resistance becomes more satisfactory, and in a sintered bearing for an EGR valve, the sintering time is preferably from 20 minutes to 60 minutes (for example, 30 minutes).

The aluminum-copper alloy powder generates various liquid phases when the temperature is equal to or higher than 548° C. as the eutectic temperature. When the liquid phases are generated, the aluminum-copper alloy powder expands, and a sintering neck is formed owing to the generated liquid phases, which leads to densification, resulting in reduction in dimensions. In this embodiment, as a result of the sintering in the mesh-belt type continuous furnace 15, the surface of the sintered compact is oxidized, and the sintering thereof is inhibited. Therefore, the sintered compact is not densified, and the dimensions thereof remain increased. Note that, the inside of the sintered compact is sintered without being oxidized, and hence the strength of the sintered compact can be ensured sufficiently. Owing to the use of the mesh-belt type continuous furnace 15, the sintering time from the supply of the green compact 1' to the release thereof can be shortened to mass-produce products, and cost can also be reduced. Further, from the viewpoint of the function of the sintered bearing, the strength can be ensured sufficiently.

In the sintering step, the added phosphorus alloy powder exhibits an effect so that a sintered compact of good quality can be formed. Phosphorus enhances wettability between a solid phase and a liquid phase during sintering, and hence a sintered compact of good quality can be obtained. It is preferred that the blending amount of phosphorus be from 0.1% by weight to 0.6% by weight, specifically 0.1% by weight to 0.4% by weight. When the blending amount of phosphorus is less than 0.1% by weight, the accelerating effect on the sintering between a solid phase and a liquid phase is unsatisfactory. On the other hand, when the blending amount of phosphorus is more than 0.6% by weight, that is, more than 0.4% by weight, which is a preferred value, a sintered compact to be obtained becomes brittle through segregation.

Further, graphite is present mainly as free graphite in pores dispersed and distributed in a substrate and contributes to the enhancement of abrasion resistance by imparting excellent lubricity to a sintered bearing. The blending amount of graphite is preferably from 3% by weight to 10% by weight, more preferably from 6% by weight to 10% by weight. When the blending amount of graphite is less than 6% by weight, the effect of enhancing lubricity and abrasion resistance through the addition of graphite is not attained easily in the sintered bearing for an EGR valve in a high-temperature dry environment. When the blending amount of graphite is less than 3% by weight, the effect of enhancing lubricity and abrasion resistance through the addition of graphite is not attained in the sintered bearing for an EGR valve in a high-temperature dry environment. Meanwhile, it is not preferred that the blending amount of graphite be more than 10% by weight because the material strength is decreased, and the diffusion of aluminum into copper is inhibited.

[Sizing Step S5]

Figure 11A:
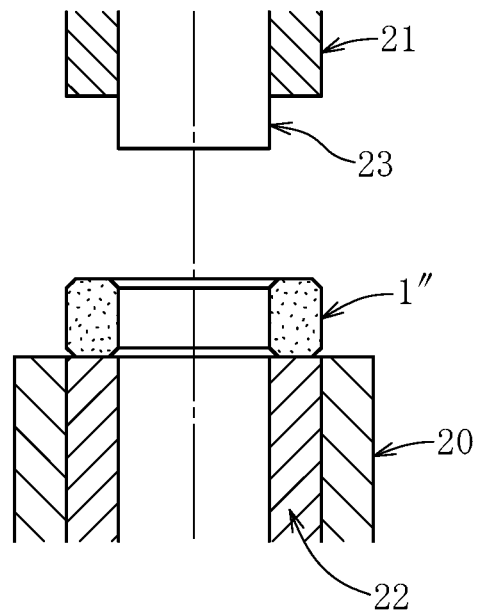
FIG. 11a is a view for illustrating a state in which a sintered compact is set on a mold for sizing processing.
Figure 11B:
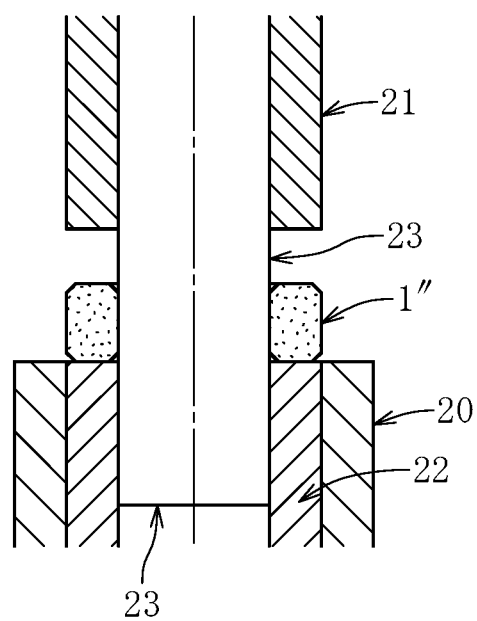
FIG. 11b is a view for illustrating a state in which a core is lowered.
Figure 11C:
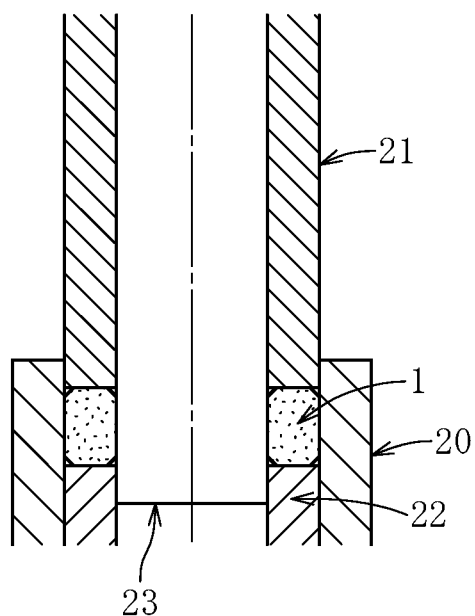
FIG. 11c is a view for illustrating a state in which sizing processing is finished.

In the sizing step S5, the sintered compact that has expanded by sintering compared to the green compact is subjected to dimension shaping. FIG. 11 are illustrations of the details of the sizing step S5. A mold for sizing processing comprises a the 20, an upper punch 21, a lower punch 22, and a core 23. As illustrated in FIG. 11a, a sintered compact 1" is set on the lower punch 22 while the core 23 and the upper punch 21 are retreated upward. As illustrated in FIG. 11b, first, the core 23 enters a radially inner portion of the sintered compact 1". Then, as illustrated in FIG. 11c, the sintered compact 1" is pushed into the die 20 by the upper punch 21. After that, the sintered compact 1" is compressed with the upper and lower punches 21 and 22. As a result, the surface of the sintered compact 1" is subjected to dimension shaping.

The mold used during the above-mentioned sizing step comprises the die 20, a pair of the punches 21 and 22, and the core 23, and the radially inner side of the sintered compact 1" is shaped with the core 23 by compressing the sintered compact 1" from both sides in the axial direction and the radially outer side with the punches 21 and 22 and the die 20. Thus, the sintered bearing 1 can be subjected to dimension shaping and desired pores can be formed through effective use of the expansion of an aluminum bronze-based sintered bearing by sintering. Free graphite is distributed in the pores, and hence sliding characteristics become excellent.

The sintered bearing 1 for an EGR valve according to this embodiment manufactured in the above-mentioned steps is excellent in abrasion resistance, corrosion resistance, and sliding characteristics in a high-temperature dry environment and can achieve compactness and reduction in cost.

Next, a sintered bearing for an EGR valve according to a second embodiment of the present invention and a method of manufacturing the sintered bearing for an EGR valve according to the second embodiment of the present invention are described. In the sintered bearing for an EGR valve and the method of manufacturing the sintered bearing for an EGR valve according to the first embodiment, aluminum-copper alloy powder and electrolytic copper powder are used as the raw material powder serving as an aluminum source and a copper source. However, the second embodiment is different from the first embodiment in that aluminum-copper alloy powder is used without adding electrolytic copper powder of a copper simple substance.

It was found that when powder of a copper simple substance was added under severer use environment, a portion in which the copper simple substance was concentrated was formed to cause a problem in corrosion resistance. As a result of conducting various investigations based on the above-mentioned finding, this embodiment was attained through the idea of using aluminum-copper alloy powder as the raw material powder serving as an aluminum source and a copper source without adding powder of a copper simple substance.

The composition comprising 9% by weight to 12% by weight of aluminum, 0.1% by weight to 0.4% by weight of phosphorus, 6% by weight to 10% by weight of graphite, and the balance comprising copper as a main component in the sintered bearing for a valve for EGR and the method of manufacturing the sintered bearing for a valve for EGR according to this embodiment is the same as that of the first embodiment. However, the raw material powder is different as follows. Specifically, the raw material powder was obtained by mixing aluminum-copper alloy powder, phosphorus alloy powder, and graphite at such a ratio that the above-mentioned composition was obtained without adding electrolytic copper powder of a copper simple substance, and by adding a total of 0.05% by weight to 0.2% by weight of aluminum fluoride and calcium fluoride serving as the sintering aid and 0.1% by weight to 1% by weight of a lubricant, such as zinc stearate or calcium stearate, for enhancing moldability with respect to a total of 100% by weight of the above-mentioned mixture.

For example, in the sintered bearing for a valve for EGR and the method of manufacturing the sintered bearing for a valve for EGR, the composition comprising 9 parts by weight to 12 parts by weight of aluminum, 0.1 part by weight to 0.4 part by weight of phosphorus, 6 parts by weight to 10 parts by weight of graphite, and the balance comprising copper as a main component can be used. In this case, for example, the raw material powder is as follows. Specifically, the raw material powder was obtained by mixing aluminum-copper alloy powder, phosphorus alloy powder, and graphite at such a ratio that the above-mentioned composition was obtained without adding electrolytic copper powder of a copper simple substance, and by adding a total of 0.05 part by weight to 0.2 part by weight of aluminum fluoride and calcium fluoride serving as the sintering aid and 0.1 part by weight to 1 part by weight of a lubricant, such as zinc stearate or calcium stearate, for enhancing moldability with respect to a total of 100 parts by weight of the above-mentioned mixture.

The description of the blending amount of phosphorus and the description of the blending amount of graphite are the same as those of the first embodiment, and hence the repeated descriptions are omitted herein.

Further, the state of the compressed layer of the surface layer of the sintered bearing 1 according to this embodiment is also the same as that of the sintered bearing according to the first embodiment illustrated in FIG. 2. Therefore, the details described with reference to FIG. 2 are applied hereto, and the repeated descriptions are omitted.

Further, although not shown, regarding organic acid corrosion resistance, more satisfactory results were confirmed in the sintered bearing according to the second embodiment than in the sintered bearing according to the first embodiment. Further, regarding the relationship of the friction coefficient, the test results of the sintered bearing according to the first embodiment and the test results of the sintered bearing according to the second embodiment are substantially equal to each other, and hence the detailed descriptions thereof are omitted herein.

In the aluminum bronze structure according to this embodiment, which uses aluminum-copper alloy powder as a copper source without adding powder of a copper simple substance, it is preferred that the ratio γ-phase/α-phase of the γ-phase and the α-phase be set to 0≤γ-phase/α-phase≤0.10. When the ratio γ-phase/α-phase falls within the range of 0≤γ-phase/α-phase≤0.10, organic acid corrosion resistance becomes excellent.

The results obtained by measuring the hardness of the sintered bearing for an EGR valve according to the second embodiment are shown in Table 4. The method of evaluating the hardness shown in Table 4 and the like are the same as the method of evaluating the hardness shown in Table 3 and the like, and hence the detailed descriptions thereof are omitted herein.

TABLE 4

|  | Measurement position | Hardness (Hv) | | |
|---|---|---|---|---|
| Example 2 | α-phase | 100 | 120 | 140 |
|  | γ-phase | 200 | 220 | 240 |
| Comparative Example 1 | Bronze phase | 80 | 70 | 75 |

As shown in Table 4, the hardness of the copper-based sintered bearing is approximately from 70 to 80, whereas the hardness of the sintered bearing for an EGR valve according to the second embodiment is, for example, approximately from 100 to 240. From those results, it can be determined that the sintered bearing for an EGR valve according to the second embodiment is a sintered bearing that is more excellent in abrasion resistance than the copper-based sintered bearing. The reason for this is as follows. The hardness of the α-phase that is a soft phase is approximately from 100 to 140, and the hardness of the γ-phase that is a hard phase is approximately from 200 to 240. Thus, the hardness of any phase of the sintered bearing for an EGR valve according to the second embodiment is higher than that of the copper-based sintered bearing.

The sintered bearing for an EGR valve according to this embodiment can ensure corrosion resistance even under severer use environment.

Next, the manufacturing method according to the second embodiment is described. The manufacturing method according to the second embodiment is also the same as the method of manufacturing a sintered bearing according to the first embodiment. Therefore, the details described above are applied hereto, and only the differences in the raw material powder preparation step S1 and the molding step S2 are described.

[Raw Material Powder Preparation Step S1]

In the raw material powder preparation step S1, raw material powder of the sintered bearing 1 is prepared. The raw material powder was prepared by adding a total of 0.05% by weight to 0.2% by weight of aluminum fluoride and calcium fluoride serving as the sintering aid, and 0.1% by weight to 1% by weight of a lubricant, such as zinc stearate, for enhancing moldability with respect to a total of 100% by weight of 85% by weight to 93% by weight of aluminum (7% by weight to 11% by weight)-copper alloy powder, preferably, aluminum (8% by weight to 10% by weight)-copper alloy powder, 1% by weight to 5% by weight of phosphorus (7% by weight to 10% by weight)-copper alloy powder, and 6% by weight to 10% by weight of graphite powder. The aluminum (7% by weight to 11% by weight)-copper alloy powder was pulverized to adjust a grain size thereof. In the same way as in the first embodiment, the above-mentioned raw material powder is supplied to, for example, the can body 11 of the V-shaped mixer 10 illustrated in FIG. 9, and is homogeneously mixed by rotating the can body 11.

For example, the content of aluminum is set to, for example, 8.5 parts by weight or more and 10 parts by weight or less, specifically, 9 parts by weight or more and 9.5 parts by weight or less with respect to a total of 100 parts by weight corresponding to a total of 100% by weight of 85% by weight to 93% by weight of aluminum (7% by weight to 11% by weight)-copper alloy powder, 1% by weight to 5% by weight of phosphorus (7% by weight to 10% by weight)-copper alloy powder, and 6% by weight to 10% by weight of graphite powder.

For example, the raw material powder can be used, which is obtained by adding a total of 0.05 part by weight to 0.2 part by weight of aluminum fluoride and calcium fluoride serving as the sintering aid, and 0.1 part by weight to 1 part by weight of a lubricant, such as zinc stearate, for enhancing moldability with respect to a total of 100 parts by weight of 85 parts by weight to 93 parts by weight of aluminum (7% by weight to 11% by weight)-copper alloy powder, preferably, aluminum (8% by weight to 10% by weight)-copper alloy powder, 1 part by weight to 5 parts by weight of phosphorus (7% by weight to 10% by weight)-copper alloy powder, and 3 parts by weight to 10 parts by weight, preferably 6 parts by weight to 10 parts by weight of graphite powder.

As the sintered bearing according to this embodiment, depending on the type of an EGR valve and the like, for example, a sintered bearing for an EGR valve not comprising oils, such as lubricating oil, and a sintered bearing for an EGR valve comprising a small amount of lubricating oil can be used.

The present invention is not limited to the above-mentioned embodiments. As a matter of course, various modifications can be made thereto without departing from the gist of the present invention. The scope of the present invention is defined in claims, and encompasses equivalents described in claims and all changes within the scope of claims.

DESCRIPTION OF REFERENCE SIGNS

1 sintered bearing for EGR valve
1' green compact
1" sintered compact
1a bearing surface
1b radially outer surface
1c end surface
15 mesh-belt type continuous furnace
20 die
21 upper punch
22 lower punch
23 core
31 EGR valve
46 shaft
D1 inner diameter dimension of bearing surface
Pb compressed layer
Po compressed layer

The invention claimed is:

1. A sintered bearing for an EGR valve, comprising, 9% by weight to 12% by weight of aluminum, 0.1% by weight to 0.6% by weight of phosphorus, 3% by weight to 10% by weight of graphite, and the balance comprising copper as a main component, and inevitable impurities, wherein:

the sintered bearing has a structure of a sintered aluminum-copper alloy, the sintered bearing further comprises free graphite distributed in pores formed so as to be dispersed, the sintered bearing does not contain tin, a portion in which a copper simple substance is concentrated does not substantially exist in the sintered bearing, the sintered bearing has a bearing surface on an inner circumference and a radially outer surface, the sintered bearing has compressed layers on the radially outer surface and the bearing surface, respectively, a density ratio $\alpha o$ of the compressed layer on the radially outer surface side is $80\% \leq \alpha o \leq 95\%$, and a density ratio $\alpha b$ of the compression layer on the bearing surface side is $80\% \leq \alpha b \leq 95\%$, the density ratio $\alpha o$ of the compressed layer on the radially outer surface side and the density ratio $\alpha b$ of the compressed layer on the bearing surface side are both higher than a density ratio of an inside, and when an average value of depths of the compressed layer on the radially outer surface side is defined as To, an average value of depths of the compressed layer on the bearing surface side is defined as Tb, and ratios of To and Tb to an inner diameter dimension D1 of the bearing surface are defined as To/D1 and Tb/D1, respectively, To/D1 are set to $1/100 \leq \text{To/D1} \leq 1/15$ and Tb/D1 are set to $1/100 \leq \text{Tb/D1} \leq 1/15$.

2. The sintered bearing for an EGR valve according to claim 1, wherein the structure of the sintered aluminum-copper alloy comprises an $\alpha$-phase.

3. The sintered bearing for an EGR valve according to claim 1, wherein a ratio $\gamma$-phase/$\alpha$-phase of a $\gamma$-phase and an $\alpha$-phase of the structure of the sintered aluminum-copper alloy set to $0 \leq \gamma\text{-phase}/\alpha\text{-phase} \leq 0.10$.

4. The sintered bearing for an EGR valve according to claim 2, wherein a ratio $\gamma$-phase/$\alpha$-phase of a $\gamma$-phase and an $\alpha$-phase of the structure of the sintered aluminum-copper alloy is set to $0 \leq \gamma\text{-phase}/\alpha\text{-phase} \leq 0.10$.

* * * * *